F. H. SUMMERIL.
DEMOUNTABLE WHEEL RIM.
APPLICATION FILED JUNE 28, 1916.

1,234,820.

Patented July 31, 1917.
2 SHEETS—SHEET 1.

Inventor
Frank H. Summeril

By David P. Moore.

Attorney

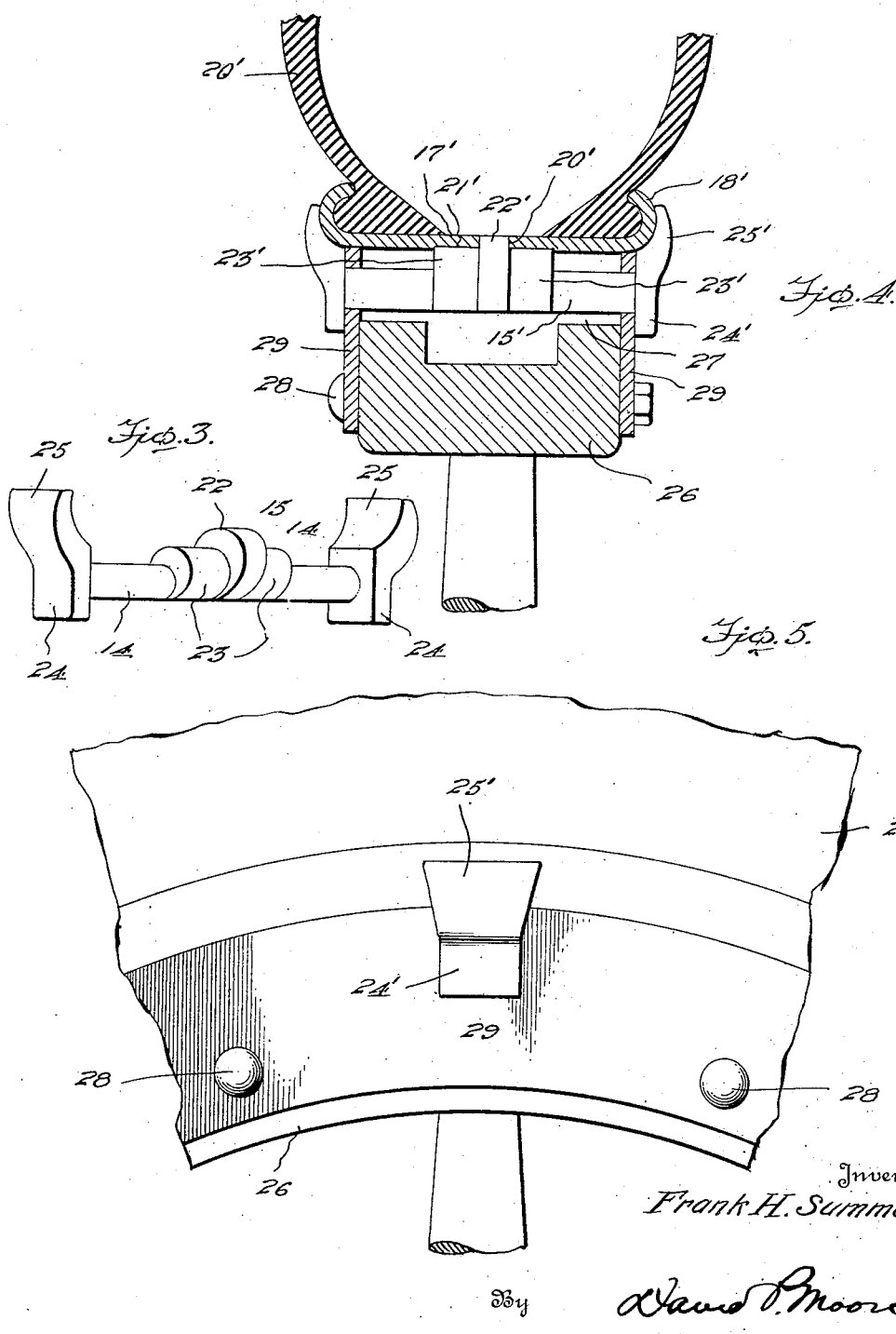

UNITED STATES PATENT OFFICE.

FRANK H. SUMMERIL, OF LOS ANGELES, CALIFORNIA, ASSIGNOR, BY MESNE ASSIGNMENTS, TO KEYSTONE VEHICLE PARTS COMPANY, INC., OF NEW YORK, N. Y., A CORPORATION OF NEW YORK.

DEMOUNTABLE WHEEL-RIM.

1,234,820.  Specification of Letters Patent.  Patented July 31, 1917.

Application filed June 28, 1916. Serial No. 106,397.

*To all whom it may concern:*

Be it known that I, FRANK H. SUMMERIL, a citizen of the United States, residing at Los Angeles, in the county of Los Angeles and State of California, have invented certain new and useful Improvements in Demountable Wheel-Rims, of which the following is a specification, reference being had therein to the accompanying drawings.

This invention relates to improvements in demountable rims for wheels, one object of the invention being the provision of a demountable rim for carrying pneumatic tires and especially adapted for use upon motor cars, and so constructed that a plain band rim may be quickly and easily secured to the felly or rim of a wheel and prevented from having circumferential or transverse movement.

A further object of this invention is the provision of a demountable rim structure in which a plurality of locking members mounted for oscillation are carried by the rim or felly and have end engaging members for clamping the opposite sides of the demountable rim to hold such rim against transverse movement, while coöperative means are carried by such locking members and the rim to lock the same against circumferential movement and at the same time assist in holding it from transverse movement.

In the accompanying drawings:—

Fig. 3 is a perspective view of the oscillatory locking member *per se*.

Fig. 4 is a view similar to Fig. 1, showing the present construction applied to a wooden wheel.

Fig. 5 is a side elevation of a portion of a wooden wheel showing the locking end in locked position.

Figure 1:
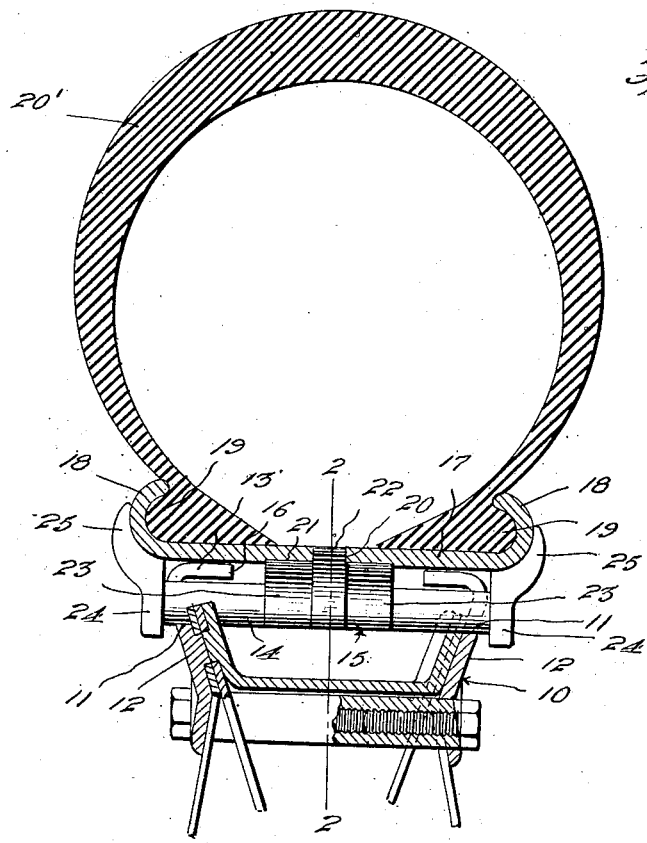
Figure 1 is a cross section through one form of rim especially adapted for a suspension or wire type wheel showing the present invention in use thereon.
Figure 2:
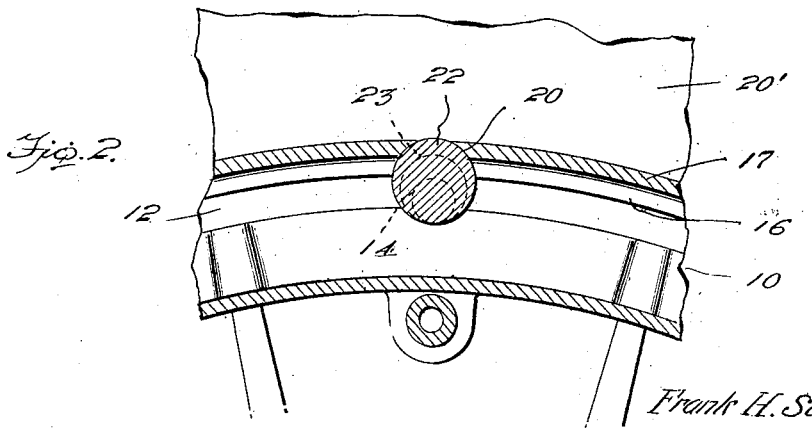
Fig. 2 is a section taken on line 2—2 of Fig. 1.

Referring to the drawings, and more particularly to Figs. 1, 2 and 3, the metal rim 10 which is similar to the construction shown and described in my co-pending application, filed even date herewith, Serial Number 106,398, has the openings 11 formed in the pressed steel bands 12 with the portion 13 slit so that the cylindrical portions 14 of the locking member 15 may be inserted before the edges 16 are bent inwardly.

Adapted to rest upon the bent in portions 13 is the demountable rim 17 having the inturned flanges 18 for receiving the rim engaging portions 19 of the outer casing 20' which may be taken as indicative of any form of pneumatic tire.

This rim throughout its length at equidistant points is provided with centrally disposed openings 20 and depressions or recesses 21, while carried by each locking member 15 is a centrally disposed eccentric shoulder 22 which is adapted to seat within the opening 20 and thus center the rim, and at the same time hold it from circumferential movement, the two cams 23 being simultaneously engaged with the depressions 21 so as to coöperate with the eccentric shoulder in holding the rim in place.

Carried upon the outer end of the locking member 15 are the heads 24, each one of which is provided with the hooked terminal 25 for engaging the flanges 18 of the demountable rim, the inner faces thereof being slightly cammed so that a wedging action is imparted to more securely hold the parts in the position as shown.

In the construction shown in Figs. 4 and 5, the wooden felly 26 is provided with the transverse recesses 24 at equi-distant points, and has attached by means of bolts 28 to opposite sides thereof the two annular bands or rings 29.

The locking member 15' which is similar to the member 15 and the corresponding parts of which are primed, is operated in a similar manner and mounted in the bands 29 so as to engage the demountable rim 17' in a similar manner, as heretofore described, and hold the rim and its tire 20' in proper position.

From the foregoing description, it is evident that with a demountable rim constructed according to and embodying the present invention, the demountable rim may be made so as to fit snugly upon the metal rim or wooden felly and be held thereto by means of the oscillatory members 15 and 15' and without the complicated wedging structures that now impart radial action to the rim, which, in this instance, is merely locked against transverse and circumferential movement, and in such a manner that it is impossible to have the demountable rim mounted otherwise than concentric with the felly.

What I claim as new is:—

1. In combination, a wheel having a felly provided with a plurality of transverse receptacles, a plurality of oscillatory members mounted in said receptacles, each of said members being provided with a plurality of cams, one of said cams being larger than the other, and a demountable rim provided with a receptacle for each of the larger cams, said demountable rim being disposed to fit upon the felly and be locked from circumferential movement when engaged by the cams of the oscillatory members.

2. In combination, a wheel having a felly provided with a plurality of transverse receptacles, a plurality of oscillatory members mounted in said receptacles, each of said members constituting a shank having upon each end a rim engaging terminal and intermediate of the ends thereof a plurality of cams, one of said cams being larger than the other cam, a demountable rim having a plurality of receptacles for the larger cams and adapted to fit upon the felly and be held from lateral and circumferential movement when engaged by the terminals and the cams of the oscillatory members.

3. In combination, a wheel, two apertured annular plates carried thereby, a plurality of oscillatory members mounted in said apertured plates, an eccentric shoulder and a locking cam intermediate of the ends of each oscillatory member, two hooked members carried upon the extreme ends of each oscillatory member, and a demountable rim adapted to fit circumferentially of the felly and the plates and provided with a plurality of openings for receiving the eccentric shoulders of the oscillatory members and with recesses for receiving the cams, the outer edges of the rim being adapted to be engaged by the locking terminals of the oscillatory member.

4. A wheel, a felly, two apertured annular plates attached to opposite sides of the felly, a plurality of oscillatory members mounted in said plates, each of said members being provided intermediate of its ends with a plurality of cams, one of which is larger than the other, a terminal rim engaging means upon both ends of each member and projecting exteriorly of the plates, and a demountable rim for fitting annularly of the plates and provided with cam receptacles for the larger cams, whereby when the cams are in engagement with the rim the terminal hooks engage the edges of the rim and the rim is held from circumferential and lateral movements.

In testimony whereof I affix my signature.

FRANK H. SUMMERIL.

Copies of this patent may be obtained for five cents each, by addressing the "Commissioner of Patents, Washington, D. C."